United States Patent
Brigati et al.

[19]

[11] Patent Number: 5,841,314
[45] Date of Patent: Nov. 24, 1998

[54] CHARGE PUMP TYPE OF NEGATIVE VOLTAGE GENERATOR CIRCUIT AND METHOD

[75] Inventors: Alessandro Brigati, Aix en Provence; Nicolas Demange, Lessy; Maxence Aulas, St Haon le Vieux; Marc Guedj, Pont Saint Esprit, all of France

[73] Assignee: SGS-Thomson Microelectronics S.A., Saint Genis, France

[21] Appl. No.: 663,524

[22] Filed: Jun. 13, 1996

[30] Foreign Application Priority Data

Jun. 21, 1995 [FR] France .................... 95 07621

[51] Int. Cl.$^6$ .................. H03K 3/01; G11C 7/00
[52] U.S. Cl. .................. 327/536; 327/537; 327/546; 327/534; 327/80; 365/226
[58] Field of Search .................. 327/80, 403, 404, 327/407, 408, 410, 534, 535, 536, 539, 538, 566, 589; 365/226; 307/110

[56] References Cited

U.S. PATENT DOCUMENTS

| | | | |
|---|---|---|---|
| 5,077,691 | 12/1991 | Haddad et al. | 365/218 |
| 5,120,993 | 6/1992 | Tsay et al. | 307/296.4 |
| 5,448,198 | 9/1995 | Toyoshima et al. | 327/534 |

FOREIGN PATENT DOCUMENTS

| | | | |
|---|---|---|---|
| A-0 217 065 | 4/1987 | European Pat. Off. | G05F 3/20 |
| A-0 222 472 | 5/1987 | European Pat. Off. | G05F 3/20 |

*Primary Examiner*—Timothy P. Callahan
*Assistant Examiner*—Dinh Le
*Attorney, Agent, or Firm*—Wolf, Greenfield & Sacks, P.C.

[57] ABSTRACT

Disclosed is a charge pump type of negative voltage generator circuit, constructed on a P type substrate and supplying a negative voltage at one output by the pumping of negative charges in n series-connected pumping cells, n being an integer, these pumping cells including P type transistors whose wells are connected to a node to be positively biased. This circuit includes a switching circuit for selectively supplying, at the node, a voltage for biasing of the wells that is greater than or equal to the potential present at the output so long as this potential is greater than a positive reference voltage, and provides a voltage of fixed value for biasing of the wells when the potential present at the output is smaller than the reference voltage. Thus, the appearance of latchup phenomena in the transistors of the pumping cells is prevented.

24 Claims, 2 Drawing Sheets

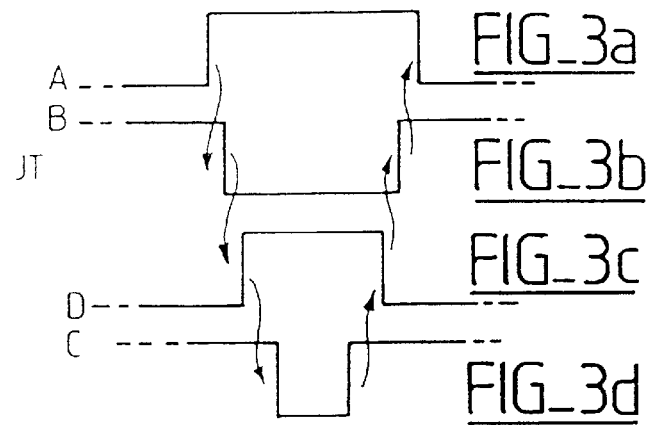
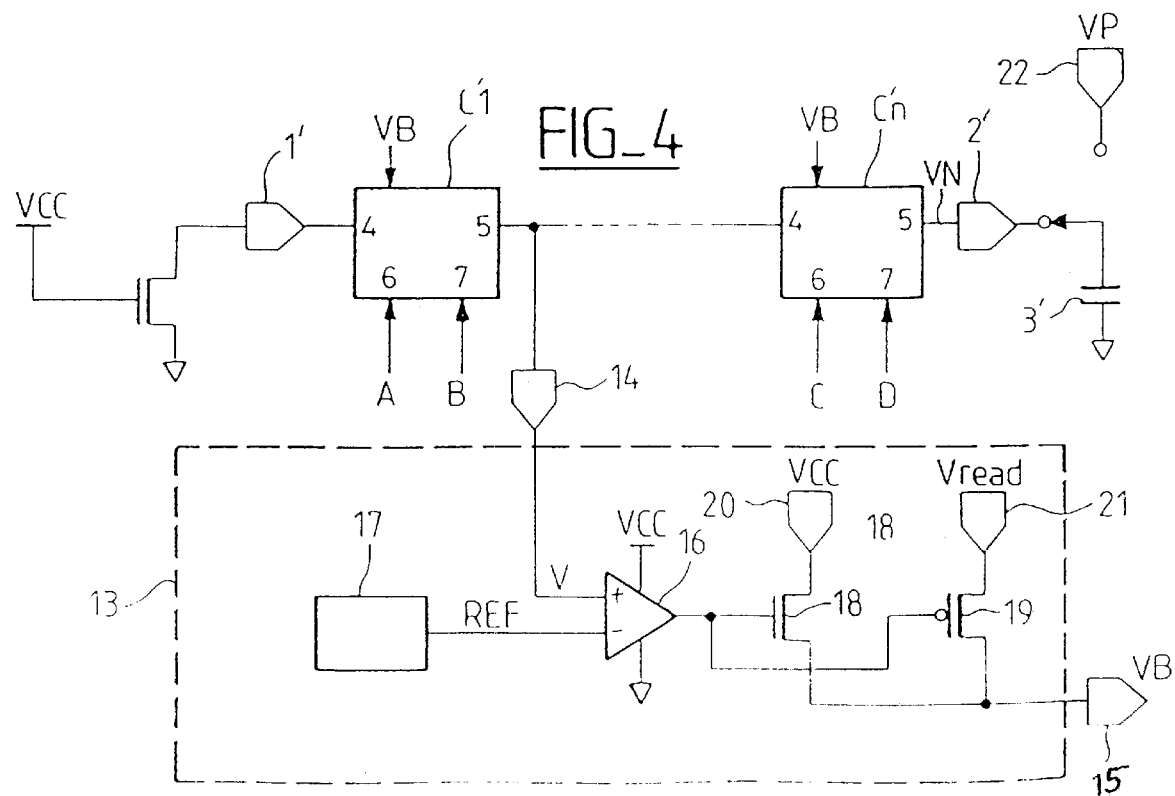

CHARGE PUMP TYPE OF NEGATIVE VOLTAGE GENERATOR CIRCUIT AND METHOD

BACKGROUND OF THE INVENTION

1. Field of the Invention

The invention relates to a charge pump type of negative voltage generator circuit.

At present, negative high voltage generator circuits of the charge pump type are being increasingly used in integrated circuits. Thus, for example, U.S. Pat. No. 5,077,691 describes a pump of this kind and its application to the programming of a flash EEPROM type memory.

2. Discussion of the Related Art

FIG. 1 is a schematic view of a known pump structure made by means of MOS technology using a P type substrate. It has a set of n (with n as a whole number) elementary cells C1 to Cn, the structure of which is shown in FIG. 2. These cells are series-connected between an input 1 and an output 2. The aim of such a circuit, conventionally, is to supply a capacitive type of circuit, represented schematically in FIG. 1 by a capacitor 3 with a negative voltage VN produced from a positive supply voltage VCC and a reference voltage or ground. These cells receive piloting signals A, B, C, D (illustrated in the timing diagrams 3a to 3d) switching over cyclically between 0 volts (ground) and VCC.

An elementary cell shown in FIG. 2 includes:
- an input 4 to receive a voltage IN,
- an output 5 to provide a voltage OUT, and
- two inputs 6 and 7 to receive clock signals CK1 and CK2.

The cell shown in FIG. 2 includes:
- a first P type transistor 8 whose source is connected to the input 4 and whose drain is connected to the output 5,
- a second P type transistor 9 whose drain is connected to the input 4, whose source is connected to the control gate of the first P type transistor 8 and whose control gate is connected to the output 5,
- a third P type transistor 10 mounted as a diode, whose source and control gate are connected to the input 4 and whose drain is connected to the output 5,
- a first capacitor 11 whose first pole is connected to the control gate of the P type transistor 8 and whose second pole is connected to the input 6,
- a second capacitor 12 whose first pole is connected to the output 5 and whose second pole is connected to the input 7.

In practice, the capacitors 11 and 12 are made with P type transistors, the first pole of these capacitors corresponding to a control gate and the second pole corresponding to a drain and to a source connected to each other.

The signals CK1 and CK2 will be respectively either the signals A and B shown in FIGS. 3a and 3b or the signals C and D shown in FIGS. 3d and 3c.

Assuming that the signals A and C are initially at 0 volts and that the signals B and D are initially at VCC, the signals A, B, C and D are such that:

- the increase to VCC of the signal A leads to the decrease to 0 of the signal B,
- the decrease to 0 of the signal B leads to the increase to VCC of the signal D,
- the increase to VCC of the signal D leads to the decrease to 0 of the signal C, this signal C rising up again to VCC after a certain period of time,
- the increase again to VCC of the signal C leads to the decrease to 0 of the signal D,
- the decrease of the signal D leads to the increase to VCC of the signal B,
- the increase to VCC of the signal B leads to the decrease to 0 of the signal A, this signal A rising subsequently to VCC and so on and so forth.

In one cell, the negative charges are transferred from the input 4 on a trailing edge of the signal CK1 (namely of A or of C), the transistor 8 being then on. On a leading edge of this signal CK1, the transistor 8 is off. On a trailing edge of the signal CK2 (namely of B or of D), the output voltage OUT increases in absolute value by VCC.

With consecutive cells receiving signals that have opposite polarities at their inputs 6 and 7, they are successively connected two by two. Each cell is connected alternately to the cell that follows it and to the cell that precedes it. The input of the first cell C1 is connected to the input 1, this cell being connected to the ground. The negative charges are gradually transferred from one cell to the other and the negative output voltage VN (the voltage present at output of the last cell Cn) will gradually increase in terms of absolute value.

As stated, the pump is constructed on a P type substrate. Conventionally, the wells of the P type transistors are therefore biased positively to ensure that they can be on. This biasing is done for example by connecting the wells to a common conductive line made on a metallization layer of the MOS circuit.

The potential of the wells, referenced VB, is generally limited. This makes it possible to avoid the creation of excessively large gate-well fields and, hence, to avert the risk of destruction of the PMOS transistors. Furthermore, it is preferable to limit the potential of the wells if high negative voltages, for example ranging from −10 to −15 volts, are produced. An excessively large difference in potential between the wells and the active zones of the transistors of the pumping cells risks causing the destruction of these transistors if it reaches the breakdown voltage of these transistors. Finally, limiting of the potential of the wells makes it possible to limit the losses in the transistors due to the substrate effect. This limiting of the substrate effect enables making a more compact pump because the lower the losses in these transistors, the smaller will be the number of cells needed to produce a voltage of a given value. Besides, the existence of switching operations in the transistors 8 of the pumping cells is conditioned by the fact that the supply voltage is greater than the losses, expressed in terms of absolute value, in these transistors. The limiting of the substrate effect therefore enables the construction of a pump that works for lower values of supply voltage.

The limiting of the potential VB does not raise any problem so long as the capacitive circuit supplied at output of the pump is connected only to this pump. Now, in circuits such as the one described for example in U.S. Pat. No. 5,077,691, the capacitive circuit in question is formed by gates of storage transistors that can also be connected to supply circuits producing positive voltages. Consequently, it may happen that when the output 2 of the pump is connected to the capacitive circuit 3, this circuit is charged positively at a voltage VP. During a transitory phase, the positive charges will be discharged through the cells Cn to C1 of the pump, from its output 2 to its input 1. If the voltage VP is greater than the desired bias voltage VB of the wells of the transistors of the cells of the pump, there is a risk of emergence of a latchup phenomenon by the creation of parasitic PNP transistors between the substrate and the active regions of the P type transistors of the cells. One approach is to bias the wells in such a way that this risk of latchup is eliminated. That is to say, in specific terms, one approach is to choose VB such that VB is always greater than VP. As compared with a pump supplying no capacitive circuit that can be charged positively, there is a risk that, in order to prevent the risk of latchup, it will become necessary to increase the number of cells of the pump (the substrate effect being greater in the transistors of the pumping cells) or to limit the value of the voltage produced by the pump (to avert a risk of the breakdown of the transistors).

SUMMARY OF THE INVENTION

An aim of the invention is to provide a pump structure that enables the biasing potential of the wells to be limited while at the same time presenting no risk of latchup.

Thus, the invention relates to a charge pump type of negative voltage generator circuit, constructed on a P type substrate and supplying a negative voltage at one output by the pumping of negative charges in n series-connected pumping cells, n being an integer, these pumping cells comprising P type transistors whose wells are connected to a node to be positively biased, wherein said circuit comprises switching means for selectively supplying at the node, a voltage for biasing of the wells that is greater than or equal to the potential present at the output so long as this potential is greater than a positive reference voltage, and to give a voltage of fixed value for biasing the wells when the potential present at the output is smaller than this reference voltage.

BRIEF DESCRIPTION OF THE DRAWINGS

Other features and advantages shall appear from the following description, made with reference to the appended drawings, of which:

FIGS. 3 to 3d show timing diagrams of piloting signals for the pump of FIG. 1;

FIG. 4 is a schematic view of a pump according to the invention.

DETAILED DESCRIPTION

Figure 1:
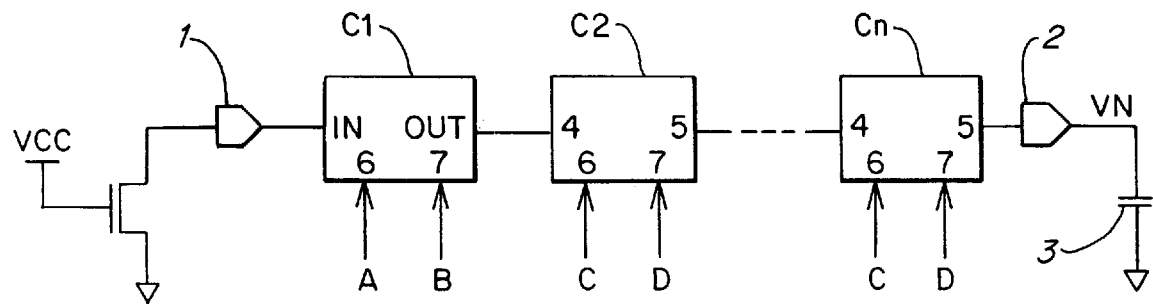
FIG. 1 is a schematic view of a negative charge pump according to the prior art.
Figure 2:
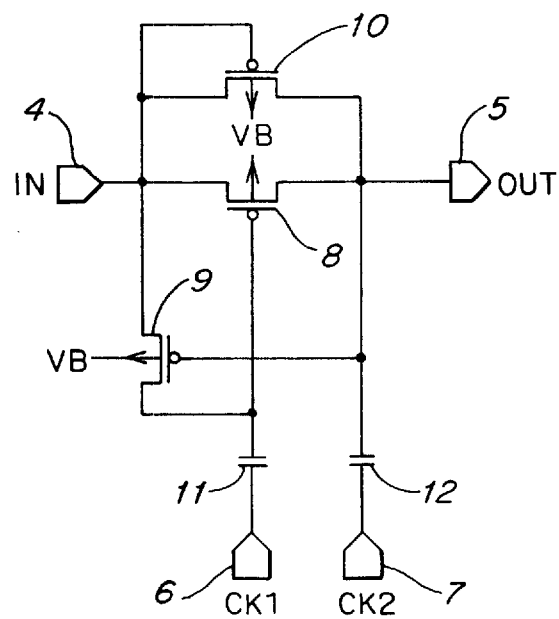
FIG. 2 is a detailed view of a basic cell of the pump of FIG. 1.

FIG. 1 is a schematic view of a known pump structure made by means of MOS technology using a P type substrate. It has a set of n (with n as a whole number) elementary pumping cells C1 to Cn, the structure of which is shown in FIG. 2. These cells are series-connected between an input 1 and an output 2. The aim of such a circuit, conventionally, is to supply a capacitive type of circuit, represented schematically in FIG. 1 by a capacitor 3 with a negative voltage VN produced from a positive supply voltage VCC and a reference voltage or ground. These cells receive piloting signals A, B, C, D (illustrated in the timing diagrams 3a to 3d) switching cyclically between 0 volts (ground) and VCC.

An elementary cell shown in FIG. 2 comprises an input 4 to receive a voltage IN, an output 5 go give a voltage OUT, and two inputs 6 and 7 to receive clock signals CK1 and CK2.

The cell shown in FIG. 2 has a first P type transistor 8 whose source is connected to the input 4 and whose drain is connected to the output 5. It has a second P type transistor 9 whose drain is connected to the input 4, whose source is connected to the control gate of the transistor 8 and whose control gate is connected to the output 5. The cell further has a third P type transistor 10 connected as a diode, the source and control gate of this transistor being connected to the input 4 and its drain being connected to the output 5. It also has a first capacitor 11 whose first pole is connected to the control gate of the transistor 8 and whose second pole is connected to the input 6, and a second capacitor 12 whose first pole is connected to the output 5 and whose second pole is connected to the input 7.

In practice, the capacitors 11 and 12 are made with P type transistors, the first pole of these capacitors corresponding to a control gate and the second pole corresponding to a drain and to a source connected to each other.

The signals CK1 and CK2 will be, respectively either the signals A and B shown in FIGS. 3a and 3b or the signals C and D shown in FIGS. 3d and 3c.

Assuming that the signals A and C are initially at 0 volts and that the signals B and D are initially at VCC, the signals A, B, C and D are such that:

the increase to VCC of the signal A leads to the decrease to 0 of the signal B, the decrease of the signal B leads to the increase to VCC of the signal D, the increase to VCC of the signal D leads to the decrease to 0 of the signal C, this signal C rising up again to VCC after a certain period of time, the increase again to VCC of the signal C leads to the decrease to 0 of the signal D, the decrease to 0 of the signal D leads to the increase to VCC of the signal B, the increase to VCC of the signal B leads to the decrease to 0 of the signal A, this signal A rising subsequently to VCC and so on and so forth.

In one cell, the negative charges are transferred from the input 4 on a trailing edge of the signal CK1 (namely of A or of C), the transistor 8 being then on. On a leading edge of this signal CK1, the transistor 8 is off. On a trailing edge of the signal CK2 (namely of B or of D), the output voltage OUT increases in absolute value by VCC.

With consecutive cells receiving signals that have opposite polarities at their inputs 7 and 8, they are successively connected two by two. Each cell is connected alternately to the cell that follows it and to the cell that precedes it. The input of the first cell C1 is connected to the input 1 of the pump, this cell being connected to the ground. The negative charges are gradually transferred from one cell to the other and the negative output voltage VN, given at output of the last cell Cn, will gradually increase in terms of absolute value.

FIG. 4 is a schematic view of a charge pump made according to the invention. Its structure is identical to that of FIG. 1, but it has an additional circuit 13. The charge pump shown in FIG. 4 has a set of n (with n as a whole number) elementary pumping cells C'1 to C'n, the structure of which is shown in FIG. 2. These cells are series-connected between an input 1' and an output 2'. The pump supplies a capacitive type of circuit, represented in FIG. 4 by a capacitor 3' with a negative voltage VN produced from a positive supply voltage VCC and a reference voltage or ground. These cells receive piloting signals A, B, C, D (illustrated in the timing diagrams 3a to 3d) switching cyclically between 0 volts (ground) and VCC.

The wells of the P type transistors of the cells C'1 to C'n are connected by conductive means that are not shown (for example a conductive line made on a metal layer of the circuit) to a node 15 to receive a positive well potential VB. The node 15 corresponds to an output of the circuit 13.

Preferably, the circuit 13 has a comparator 16 to compare a voltage V, received at an input 14 of the circuit 13, with a reference voltage REF. This reference voltage REF will be produced preferably by a bandgap type circuit 17 (not described in detail as this type of circuit is well known to those skilled in the art). This enables the production of a reference voltage that is temperature stable and independent of the supply voltage VCC (so long as the voltage REF to be produced is lower than VCC, of course).

The output of the comparator 16 is connected to the control gate of N type MOS switch 18 and the control gate of P type MOS switch 19 in order to connect the node 15 selectively either to a first terminal 20 or to a second terminal 21, these two terminals giving positive voltages of different values. As shown in FIG. 4, node 15 is therefore connected to the source of the switch 18 and the source of 19, the drain of switch 18 is connected to terminal 20, and the drain of switch 19 is connected to terminal 21.

Let it be assumed that the capacitive circuit 3' can receive either the voltage VN produced by the pump or a positive voltage VP present at a terminal 22. It may be that when the output 2' of the pump is connected to the capacitive circuit 3', this circuit 3' gets charged positively at the voltage VP. We then have VN=VP (assuming that VN is the voltage present at the output 2'). During a transitory stage, the positive charges will be discharged through the cells C'n to C'1 of the pump, from its output 2' to the ground to which the input 1' is connected. If the voltage VP is greater than the biasing voltage VB of the wells of the transistors of the cells C'1 to C'n of the pump, there is a risk of seeing the appearance of a latchup phenomenon by the creation of parasitic PNP transistors between the substrate and the active zones of the P type transistors of the cells.

In order to prevent the appearance of this phenomenon, the node 15, to which are connected the wells of the P type transistors of the cells, is connected to the terminal 20, this terminal giving a voltage greater than or equal to VP. The switch 18 is then, at the time of such connection of node 15 to terminal 20, closed and the switch 19 is open. For example, if VP is smaller than or equal to VCC, the terminal 20 gives the voltage VCC. The comparator 16 will be supplied between the ground and the voltage VCC. The voltage VP could very well be greater than VCC. In this case, the comparator 16 will be supplied accordingly and the terminal 20 will give a voltage greater than VCC. The terminal 20 will be connected, for example, to the terminal 22, as shown in FIG. 4 by selecting means 30 having an input 32 connected to terminal 20, an output 34 connected to terminal 22, and an output 36 connected to VCC represented by node 38.

As has been seen, it is preferable to limit the value of the voltage VB to a given positive value so as not to create an excessively large gate-well field in the transistors: this would entail the risk of destroying them, making the pump inoperative. For example, it will be chosen to have VB=Vread=2.2 volts, with VCC=5 volts, the voltage Vread being the voltage given by the terminal 21.

So long as the voltage V received by the comparator 16 is greater than the potential Vread, the node 15 is connected to the terminal 20. Once the voltage V is equal to or smaller than Vread, the node 15 is connected to the terminal 21. The switch 19 is then closed and the switch 18 is open. It will be chosen to have REF≦Vread (for example REF=1.8 volts). The voltage V tapped will be preferably the voltage present at output of the first cell C'1 of the pump in order to be sure that there is no risk of the appearance of a latchup phenomenon in any of the n cells of the pump.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A charge pump negative voltage generator circuit, constructed on a P type substrate and supplying a negative voltage at a pump output by pumping negative charges in n series-connected pumping cells, n being an integer, these pumping cells each having a cell output and comprising P type transistors having wells connected to a node to be positively biased, wherein said circuit comprises switching means coupled to one of said pumping cells for selectively supplying, at the node, a first voltage for biasing of the wells that is greater than or equal to a potential present at the pump output so long as a potential at an output of the one pumping cell is greater than a positive reference voltage coupled to said switching means, and a second voltage of fixed value for biasing of the wells when the potential present at the output of the one pumping cell is smaller than said positive reference voltage.

2. A circuit according to claim 1, wherein the switching means comprise MOS type transistors for selective connection of the node to a first terminal supplying the first voltage and a second terminal supplying the second voltage, so that the node is connected to only one of the terminals at a time.

3. A circuit according to claim 2, wherein the switching means further comprise a comparator having a first input connected to the output of the one pumping cell, a second input receiving the positive reference voltage and an output to control the MOS type transistors.

4. A circuit according to claim 3, wherein the first input of the comparator is connected to the output of the first pumping cell.

5. A charge pump negative voltage generator circuit having a supply voltage, a nominal bias voltage, and a pump output having a pump-output voltage, comprising:

n series-connected pumping cells, n being an integer, each cell having a cell output and comprising P type transistors having wells connected to a biasing node;

a protective-bias voltage source for providing a protective bias voltage; and a switch coupled to a reference voltage, to one of said pumping cells, and to said protective-bias voltage source, said switch providing said protective-bias voltage to the biasing node when an output of the one pumping cell has a voltage greater than a sum of the reference voltage and a predetermined positive value including zero.

6. The circuit of claim 5, wherein one pumping cell is the pumping cell furthest in series connection from the pump output.

7. The circuit of claim 5, wherein the switch further provides the nominal bias voltage to the biasing node when the cell output of the one pumping cell has a voltage less than the sum of the reference voltage and predetermined positive value including zero.

8. The circuit of claim 5, wherein the protective-bias voltage is the same as the supply voltage.

9. The circuit of claim 5, wherein the protective-bias voltage is the same as the pump-output voltage.

10. The circuit of claim 5, wherein the sum of the reference voltage and the predetermined positive value including zero is approximately equal to the nominal bias voltage.

11. The circuit of claim 5, further comprising a comparator to compare the reference voltage with the cell output of the one pumping cell.

12. The circuit of claim 5, further comprising a comparator to compare the reference voltage with the cell output of the pumping cell furthest in series connection from the pump output.

13. The circuit of claim 5, further comprising selecting means for coupling the protective-bias voltage source to the supply voltage when the pump output voltage is less than the supply voltage, and for coupling the protective-bias voltage source to the pump output when the pump output voltage is greater than the supply voltage.

14. The circuit of claim 5, wherein each cell has a cell input that is connected to the source of a first P type transistor having a drain connected to the cell output, a second P type transistor having a drain connected to the cell input and having a source connected to the control gate of the first transistor and to the cell output, a third P type transistor having a drain and control gate both connected to the cell input and having a source connected to the output, a first capacitor having a first terminal connected to the control gate of the first transistor and a second terminal connected to a first clock input, and having a second capacitor having a first terminal connected to the cell output and a second terminal connected to a second clock input.

15. The circuit of claim 5, wherein the reference voltage is generated by a bandgap circuit.

16. The circuit of claim 5, wherein the switch comprises,
a comparator having an output, a first input connected to the reference voltage, and a second input connected to the cell output of the pumping cell,
a first N type MOS transistor having a control gate connected to the output of the comparator, a drain connected to the protective bias voltage source, and a source connected to the biasing node;
a second P type MOS transistor having a control gate connected to the output of the comparator, a drain connected to the nominal bias voltage, and a source connected to the biasing node; and
selecting means for coupling the protective-bias voltage source to the supply voltage when the pump-output voltage is less than the supply voltage, and for coupling the protective-bias voltage source to the pump output when the pump-output voltage is greater than the supply voltage.

17. A method for protecting a charge pump negative voltage generator circuit, constructed on a P type substrate and supplying a negative voltage at a pump output by pumping negative charges in n series-connected pumping cells, n being an integer, these pumping cells each having a cell output and comprising P type transistors having wells connected to a node to be positively biased, the node have a nominal bias voltage, the method comprising the steps of:
comparing a first voltage at the cell output of one pumping cell to a reference voltage;
comparing a second voltage at the pump output to a supply voltage;
providing the nominal bias voltage to the node if the first voltage is smaller than a sum of the reference voltage and a predetermined positive value including zero;
providing a first voltage source having a voltage greater than the nominal bias voltage to the node when the first voltage is greater than the sum of the reference voltage and the predetermined positive value; and
providing to a second voltage source having a voltage greater than the supply voltage to the node when the second voltage is greater than the supply voltage.

18. The method of claim 17, wherein the first voltage source is the supply voltage.

19. The method of claim 17, wherein the second voltage source is the pump output.

20. A charge pump negative voltage generator circuit for supplying a negative voltage at a pump output by pumping negative charges in n series-connected pumping cells, n being an integer, the pumping cells each having a cell output and having wells connected to a biasing node, having a nominal bias voltage, comprising:
a protective-bias voltage source for providing a protective bias voltage;
a comparator receiving a reference voltage and coupled to one of said pumping cells for comparing the output of the one cell to the reference voltage and for generating a different output signal at an output of the comparator based on a difference between the output of the one cell and the reference voltage; and
switching means coupled to the output of the comparator for providing the nominal bias voltage to the biasing node when the cell output of the one cell has a voltage less than a sum of the reference voltage and a predetermined positive value including zero.

21. A charge pump negative voltage generator circuit, constructed on a P type substrate and supplying a negative voltage at a pump output by pumping negative charges in n series-connected pumping cells, n being an integer, these pumping cells each having a cell output and comprising P type transistors have wells connected to a node to be positively biased, the node have a nominal bias voltage, the circuit comprising:
a first comparator receiving a reference voltage and coupled to one of said pumping cells for comparing a first voltage at the cell output of the one pumping cell to the reference voltage and for generating a different output signal at an output of the comparator based on a difference between the first voltage and the reference voltage; and
switching means coupled to the output of the comparator for providing the nominal bias voltage to the node when the first voltage is smaller than a sum of the reference voltage and a predetermined positive value including zero, and for providing a first voltage source having a voltage source greater than the nominal bias voltage to the node when the first voltage is greater than the sum of the reference voltage and the predetermined positive value including zero.

22. The circuit of claim 21, further comprising a second comparator to compare a second voltage at the pump output to a supply voltage, wherein the switching means further comprises:
means for connecting the node to a second voltage source having a voltage greater than the supply voltage when the second voltage is greater than the supply voltage.

23. A charge pump negative voltage generator circuit having a supply voltage, a nominal bias voltage, and a pump output having a pump-output voltage, comprising:
n series-connected pumping cells, n being an integer, each cell having a cell output and comprising transistors having wells connected to a biasing node;
a protective-bias voltage source for providing a protective bias voltage; and
a switch coupled to a reference voltage, to one of said pumping cells, and to said protective-bias voltage source, said switch providing said protective-bias voltage to the biasing node when an output of the one pumping cell has a voltage greater than a sum of the reference voltage and a predetermined positive value including zero.

24. A method for protecting a charge pump negative voltage generator circuit supplying a negative voltage at a pump output by pumping negative charges in n series-connected pumping cells, n being an integer, these pumping cells each having a cell output and comprising transistors having wells connected to a node to be positively biased, the node have a nominal bias voltage, the method comprising the steps of:

comparing a first voltage at the cell output of one pumping cell to a reference voltage;

comparing a second voltage at the pump output to a supply voltage;

providing the nominal bias voltage to the node when the first voltage is smaller than a sum of the reference voltage and a predetermined positive value including zero;

providing a first voltage source having a voltage greater than the nominal bias voltage to the node when the first voltage is greater than the sum of the reference voltage and the predetermined positive value;

providing a second voltage source having a voltage greater than the supply voltage to the node when the second voltage is greater than the supply voltage.

* * * * *